United States Patent [19]

Fertl et al.

[11] E Re. 31,122

Best Available Copy

[45] Reissued Jan. 11, 1983

[54] METHOD FOR ASCERTAINING OPTIMUM LOCATION FOR WELL STIMULATION AND/OR PERFORATION

[75] Inventors: Walter H. Fertl, Houston; Donald B. Vaello, San Antonio, both of Tex.

[73] Assignee: Dresser Industries, Inc., Dallas, Tex.

[21] Appl. No.: 183,139

[22] Filed: Sep. 2, 1980

Related U.S. Patent Documents

Reissue of:

[64] Patent No.: 4,187,908
Issued: Feb. 12, 1980
Appl. No.: 947,132
Filed: Sep. 29, 1978

[51] Int. Cl.[3] ..... E21B 47/00; E21B 47/05; G01V 5/00

[52] U.S. Cl. ..... 166/254; 73/152; 250/256

[58] Field of Search ..... 166/250, 254, 297; 73/152; 175/41; 250/253, 256

[56] References Cited

U.S. PATENT DOCUMENTS

| | | | |
|---|---|---|---|
| 2,309,835 | 2/1943 | Fearon | 166/254 X |
| 2,352,433 | 6/1944 | Herzog | 250/256 |
| 2,358,574 | 9/1944 | Howell | 250/253 |
| 2,935,021 | 5/1960 | Niles | 166/254 X |
| 3,016,961 | 1/1962 | McKay et al. | 166/254 X |
| 3,105,149 | 9/1963 | Guitton et al. | 250/253 |
| 3,336,476 | 8/1967 | Richardson | 250/256 |
| 3,817,328 | 6/1974 | Neuman | 166/250 |
| 3,940,610 | 2/1976 | Dennis et al. | 250/253 |
| 3,976,878 | 8/1976 | Chevalier et al. | 250/253 |
| 4,071,755 | 1/1978 | Supernaw et al. | 250/253 |

*Primary Examiner*—Stephen J. Novosad
*Assistant Examiner*—George A. Suchfield
*Attorney, Agent, or Firm*—Richard M. Byron; Patrick H. McCollum

[57] ABSTRACT

A method is disclosed for the in situ examination of earth formations penetrated by a borehole to ascertain the optimum location along the length thereof for instituting well stimulation operations or, where the well is cased, the optimum location for perforating the casing. The method utilizes natural gamma ray logging to determine the optimum locations with the natural gamma ray radiation of the earth formation surrounding the borehole measured and the total measurement then separated into potassium-40, uranium, and thorium energy-band signals. A differential value is derived by subtracting the energy-band signal for either potassium or thorium from the energy-band signal for uranium, with the differential thereafter compared to a energy-level standard having a preselected magnitude. The optimum locations for perforating and/or instituting well stimulation operations will be those zones in which the differential exceeds the preselected energy level standard.

10 Claims, 2 Drawing Figures

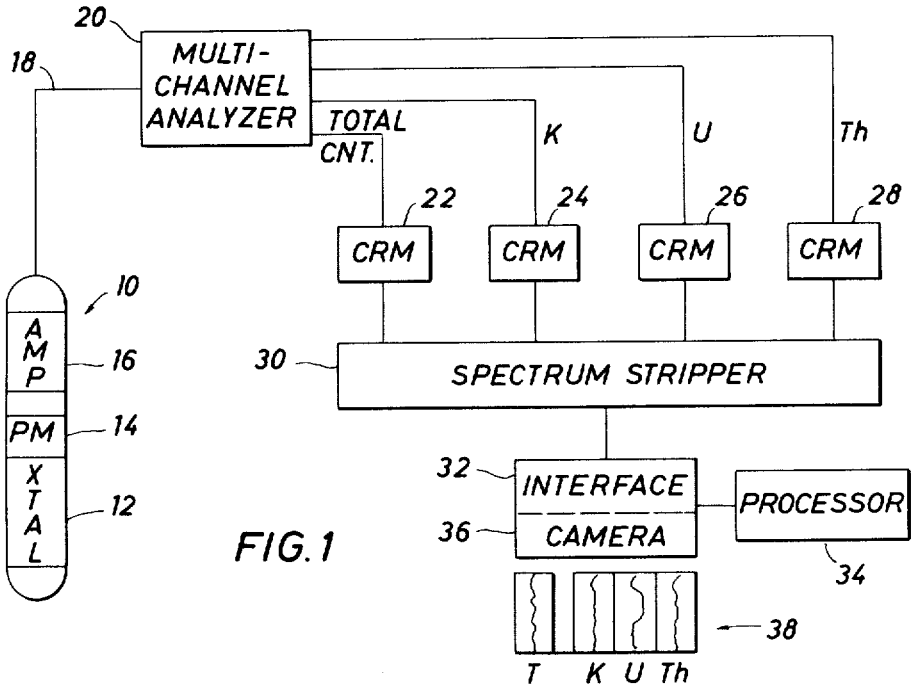
FIG. 1
FIG. 2
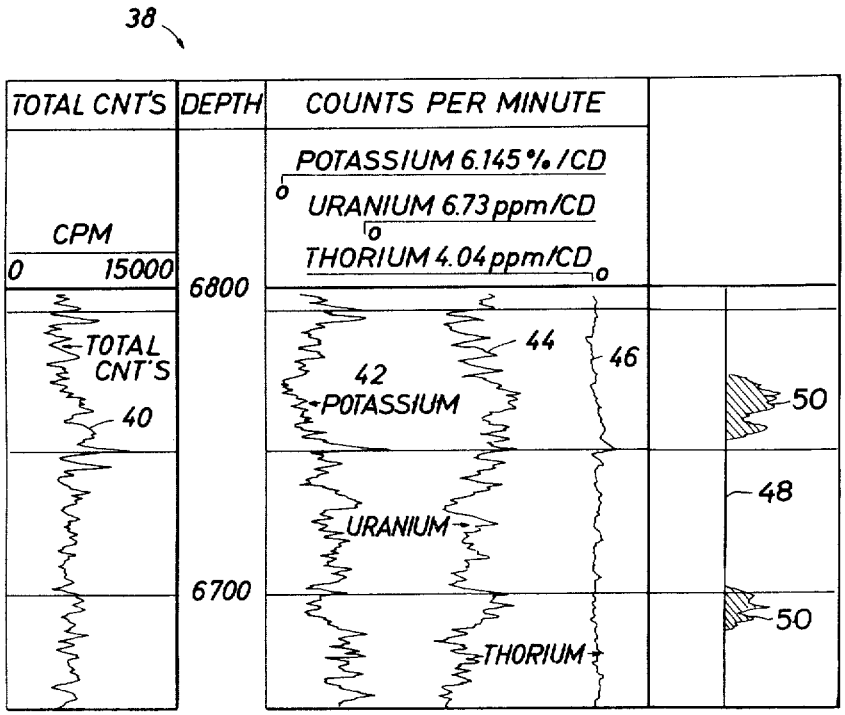

METHOD FOR ASCERTAINING OPTIMUM LOCATION FOR WELL STIMULATION AND/OR PERFORATION

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to radioactivity well logging and, more particularly, to a method utilizing natural ray gamma ray logging to determine the optimum locations along the length of a borehole penetrating earth formations to initiate well stimulation operations or, if the borehole is cased, the optimum location for perforation operations.

2. Description of the Prior Art

Various models and apparatus have been utilized in the well logging art to study the radioactive properties of subsurface formations, both where the radioactivity is natural and where it is artificially induced. In general, such methods and apparatus when applied to the field of natural gamma ray well logging having utilized three channels of spectra centered on the 1.46 MeV potassium-40, the 1.76 MeV uranium, and the 2.62 MeV thorium energies. Further, such prior art techniques have been directed to utilizing the logs to locate so-called "source rocks" for oil production in regions being explored.

One such technique utilizes natural gamma ray logs to determine the characteristics of shale formations as described in U.S. Pat. No. [4,017,755] *4,071,755*, issued Jan. 31, [1938] *1978* to Supernaw et al. Supernaw et al is directed to determining the amount of organic carbon contained within the shale formation and utilizes the gamma ray logs to derive potassium/uranium or thorium/uranium which, when compared with the organic carbon at selected depth points within the borehole are used in deriving curves indicative of the organic carbon contained within the shale deposit. As in most prior art techniques utilizing the natural gamma ray logging technique, Supernaw et al is specifically directed to locating hydrocarbon bearing strata but not to determining optimum locations for performing well stimulation operations or casing perforating operations within the boerhole adjacent to the located hydrocarbon bearing formations to improve recovery of the subsurface hydrocarbons.

Accordingly, the present invention overcomes the deficiencies of the prior art by providing a method for utilizing information derived from the natural gamma ray well logging of the borehole to provide information relating to the optimum locations within the borehole to conduct well stimulation operations or, where the borehole is cased, to conduct casing perforation operations.

SUMMARY OF THE INVENTION

A high-resolution, gamma ray spectrometer incorporated in a logging instrument is passed through a borehole, whereby natural gamma radiation strikes the crystal contained therein and causes it to scintillate, e.g., to [permit] *emit* photons in the visible energy region. The intensity of the visible energy emitted is proportional to the energy lost in the crystal by the incident gamma ray. Light energy from the crystal is optically coupled to a photo multiplier tube where the energy is [connected] *converted* to an electrical current which is then amplified and transmitted to the surface. This current is proportional to the light energy absorbed by the multiplier tube from the crystal. The current is converted to an output pulse having a voltage amplitude linearly related to the energy of the [instant] *incident* gamma rays. Upon reaching the surface, the pulses are passed through the multi channel analyzer where the pulses are sorted for each depth point according to amplitude and thereafter coupled into channels which strip out information relating to the three most commonly logged radioactive isotopes according to their peak energies with potassium-40 having a peak energy of 1.46 MeV, uranium a peak energy of 1.76 MeV and thorium a peak energy of 2.62 MeV.

The stripped signals from the three channels as well as the total gamma ray count detected by the scintillation crystal are coupled into individual count rate meters (CRM), each of which accumulates the total number of detected gamma rays contained in the associated channel signal.

Next, the outputs from each CRM is coupled into a logging camera to produce a multi trace spectral log depicting the total gamma ray count, and the gamma ray count for each of the potassium, uranium and throium channels. Additionally, the signal from each CRM is coupled into, for example, a computer. The computer processes the data to combine either of the potassium signal or the thorium signal with the uranium signal to develop a differential signal as a function of the depth of the logging instrument within the borehole. The differential signal is then compared with a preselected reference having an effective count value predetermined by the lithology of the earth formation. The depth-point location between which the differential value exceeds the reference value indicates the optimum locations to conduct perforating and/or well stimulation operations.

Accordingly, it is a feature of the present invention to provide a method for determining the optimum location along the length of a borehole for performing well stimulation operations.

It is a further object of the present invention to provide a method for determining the optimum location for perforating a cased well.

It is still a further feature of the present invention to provide a method for deriving a differential signed for comparison with a preselected reference value such that optimum locations for well stimulation or perforation are indicated between borehole depth-point locations where the differential value exceeds a preselected magnitude.

These and other features and advantages of the present invention will become apparent and a better understanding of the invention will be gained from consideration of the following detailed description of the preferred embodiments when taken in conjunction with the accompanying drawings in which:

BRIEF DESCRIPTION OF THE DRAWINGS

FIG. 1 is a simplified block diagram of an apparatus for performing the well logging technique of the invention.

FIG. 2 is a pictorial representation of a section of the log produced by the apparatus of FIG. 1 and illustrates the correlation between the measured uranium and the measured potassium or thorium as a function of depth.

DETAILED DESCRIPTION OF THE PREFERRED EMBODIMENT

Many long-life radioactive nuclides occur in nature. Of particular interest to the petroleum industry are those of potassium (K), uranium (U), and thorium (Th), all of which in various degrees are found in subsurface formations and as constituents of potential reservoir rocks. In particular, potassium occurs in increased quantities in certain clay minerals and evaporates, while uranium is often associated with depositional environments under reducing conditions and subsurface fluid movement over geologic time. As will be hereinafter described, detection of the nuclides can be accomplished by gamma ray spectroscopy methods which identify characteristic gamma rays.

Referring now to FIG. 1, a logging instrument 10 is shown to include a high-resolution gamma spectrometer comprised of a large cylindrical sodium-iodide, thallium-activated crystal 12 which is optically coupled with a photo multiplier tube 14 for producing output electrical signal representative of natural gamma radiation measured by passing logging instrument 10 through a borehole (not shown) penetrating earth formations (not shown).

As is known in the art, natural gamma radiation from various sources within the earth formation impinges upon scintillation crystal 12, producing light flashes therein whose intensity is proportional to the energy given up by the collision of the gamma ray with the crystal, thereby causing the scintillation. The light flashes thus produced are detected by the photo multiplier tube 14 which produces an electrical pulse whose amplitude or voltage level is proportional in intensity of the above-described resultant flash.

These electrical voltage signals, in the form of pulses, are coupled into amplifier 16 for amplification and transmission to the surface on a conductor 18 which forms a component of a conventional well logging cable (not shown). The amplified voltage pulses, representative of the energy in the naturally occurring [gama] *gamma* radiation in the earth formations, are coupled into a multichannel analyzer 20 which sorts gamma radiation, occurring naturally in the earth formations, as a function of energy, separating the energy into at least three energy channels or bands to separate gamma radiation occurring from the radioactive decay of isotopes of potassium, uranium and thorium. Additionally, a fourth energy channel containing the total measured spectrum is provided. Signals from total radiation, potassium, uranium and thorium channels are each coupled into a count rate meter, 22, 24, 26 and 28 respectively. Each meter 24, 26 and 28 accumulates a background-connected count rate for the particular isotope associated therewith, with count rate meter 22 accumulating the total number of gamma rays detected by crystal 12 to provide an indication of the total gamma ray count rate.

Accordingly, the multi-channel analyzer, acting through the count rate meters, provides output signals representative of the number of counts occurring in each energy channel. Each count number is characteristic of the respective radioactive decay of the isotopic potassium, uranium and thorium atoms in earth formations. These output signals are coupled into a spectrum stripper 30. As is known in the art, spectrum stripper 30 may comprise a small general purpose digital computer.

Spectrum stripping refers to the process whereby background count rates are electronically subtracted in a mathematical process from the potassium and uranium channels in the stripper 30. As a result of having the highest energy level, the thorium count rate is not stripped and may be used for further processing or forming a log directly. Thus, the stripping process is only necessary in the potassium and uranium channels as a result of the addition therein of energy-degraded thorium and, in the case of the potassium channel, uranium gammas. Count rates in the potassium and uranium channels that are obtained solely from energy-degraded thorium gammas are subtracted from the count rates due to the radio-isotopes themselves. A similar procedure for stripping energy-degraded uranium gammas from the potassium channel count rate is also performed. In this way, accurate concentrations of potassium, uranium and thorium are determined. Techniques for determining the amount of stripping required is well known in the art and will not be discussed in detail here. It will suffice to state that the spectrum measured by instrument 10 during a traverse of subsurface borehole is compared against spectral standards supplied from a standard spectrum data source (not shown) in which the gamma spectrum of known standard elements may be quantatively compared with that of the unknown earth formation penetrated by the borehole. Accordingly, coefficient representative of the fraction of the gamma ray spectrum caused by the standards as an estimate of the borehole radiation may be derived for use in the stripping process.

The total gamma energy spectrum signal along with the stripped energy spectrum signals for potassium, uranium and thorium are coupled into an interface unit 32. Unit 32 provides the interface necessary to couple the signals to various processing and/or display equipment such as a computer 34 or a logging camera 36 for the subsequent processing which comprises the method of applicant's invention as will be hereinafter described with reference to the pictorial representation of the energy spectrum log 38 depicted in FIG. 2. Although depicted as a visual representation or plot, it is to be understood that the signals developed by the apparatus of FIG. 1 may be utilized in digital computer 36 to develop the optimum location between depth-points along the borehole length indicative of the preferred location for conducting well stimulation and/or perforating operations.

As shown on log 38, the signals developed in the apparatus of FIG. 1 are depicted in graphical form of a total counts line, 40 a potassium counts line, 42, a uranium counts line, 44, and a thorium counts line, 46. To practice the method of applicant's invention, and again recognizing the signal processing may be performed within digital computer 34, a differential count [valve] *value* is derived by algebraically adding or otherwise comparing either the negative of potassium log line 42 or thorium log line 46 with uranium log line 44 at each given depth-point along the chart 38. The differential value thus obtained is then compared with a preselected reference having a constant count magnitude measured against the [uranium] *differential* count and as indicated by line 48. *The count magnitude of reference line 48 is predetermined by the lithology of the earth formation. The selection of the magnitude of reference value 48 is within the ability of one skilled in the art.*

In accordance with the invention, those areas 50 where the magnitude of the differential value is greater than the magnitude of line 48 are indicative of the optimum locations along the length of the borehole for performing well stimulation operations. Further, in the cased borehole, the same area 50 is indicative of the optimum location for perforating the casing in preparation of performing the well stimulation operation.

Accordingly, while particular embodiments of the present invention have been illustrated and described, it will be apparent to those skilled in the art that changes and modifications may be made without departing from the invention in its broader aspects.

The embodiments of the invention in which an exclusive property or privilege is claimed are defined as follows:

1. A method for determining the optimum location along the length of a borehole penetrating an earth formation for instituting well stimulation operations, comprising the steps of:

transversing the borehole penetrating the earth formation with a logging instrument having a gamma ray detector;

detecting natural gamma radiation occurring in the earth formation in the vicinity of the borehole and generating signal functionally and depth-point related to the energy and frequency of occurrence of such gamma radiation;

separating said signals into at least three energy regions corresponding to gamma radiation produced by naturally occurring radioactive isotopes of potassium, uranium and thorium occurring in said earth formations at said related depth-point.

processing said separated signals for producing individual count signals each representative of radiation occurring in each of said at least three energy regions at said relative depth-point;

combining the count signals representative of at least one of such energy regions corresponding to gamma radiation produced by radioactive isotopes of potassium and thorium with said remaining energy region count signals corresponding to gamma radiation produced by radioactive isotopes of uranium for deriving a differential signal; and comparing said differential with a preselected reference signal for determining optimum stimulation locations and at said depth-point location as indicated by said differential signal exceeding said preselected reference signal.

2. The method of claim 1, including repeating the steps therein through said step of comparing said differential signal with said reference signal for a plurality of depth-point locations in the borehole and recording all optimum locations for performing well stimulation operations as a function of borehole depth.

3. The method of claim 1, further including the step of traversing a cased borehole and perforating the casing at said locations where said differential signal exceeds preselected magnitude of said [arbitrary] *reference* signal.

4. The method of claim 1 wherein the step of deriving said differential signal, comparing said differential signal with said reference signal and displaying, as a function of depth, those areas wherein said differential signal exceeds said reference signal is performed in a digital computer.

5. The method of claim 1 wherein said step by developing said optimum location for performing well stimulation operations includes the steps of:

generating a log tape displaying the count signals of the measurement of the radioactive isotopes of potassium, uranium and thorium as a function of depth;

generating a reference cutoff value positioned at a preselected location along said log tape comparing said count signals with said reference line on said log tape; and deriving depth related locations for performing said well stimulation operations from said comparison.

*6. A method for determining the optimum location along the length of a borehole penetrating an earth formation for instituting well stimulation operations, comprising the steps of:*

*traversing the borehole penetrating the earth formation with a logging instrument having a gamma ray detector;*

*detecting natural gamma radiation occurring in the earth formation in the vicinity of the borehole and generating signal functionally and depth-point related to the energy and frequency of occurrence of such gamma radiation;*

*separating said signals into at least three energy regions corresponding to gamma radiation produced by the decay of the naturally occurring radioactive isotopes of potassium, uranium and thorium occurring in said earth formations at said related depth-point;*

*processing said separated signals for producing individual count signals each representative of radiation occurring in each of said at least three energy regions at said relative depth-point;*

*combining the count signals representative of at least one of such energy regions corresponding to gamma radiation produced by the decay of the radioactive isotopes of potassium and thorium with said remaining energy region count signals corresponding to gamma radiation produced by the decay of the radioactive isotopes of uranium for deriving a differential signal; and*

*comparing said differential with a preselected reference signal level for determining optimum stimulation locations and at said depth-point location as indicated by said differential signal exceeding said preselected reference signal.*

*7. The method of claim 6, including repeating the steps therein through said step of comparing said differential signal with said reference signal for a plurality of depth-point locations in the borehole and recording all optimum locations for performing well stimulation operations as a function of borehole depth.*

*8. The method of claim 6, further including the step of traversing a cased borehole and perforating the casing at said locations where said differential signal exceeds the preselected magnitude of said reference signal.*

*9. The method of claim 6 wherein the step of deriving said differential signal, comparing said differential signal with said reference signal and displaying, as a function of depth, those areas wherein said differential signal exceeds said reference signal is performed in a digital computer.*

*10. The method of claim 6 wherein said step by developing said optimum location for performing well stimulation operations includes the steps of:*

*generating a log tape displaying the count signals of the measurement of the decay of the radioactive isotopes of potassium, uranium and thorium as a function of depth;*

*generating a reference cutoff value positioned at a preselected location along said log tape;*

*comparing said count signals with said reference line on said log tape; and*

*deriving depth related locations for performing said well stimulation operations from said comparison.*

* * * * *